(12) United States Patent
McFarlane

(10) Patent No.: US 8,528,925 B2
(45) Date of Patent: Sep. 10, 2013

(54) RUNNING BOARD ATTACHMENT

(76) Inventor: Brian McFarlane, Hubbard, NE (US)

( * ) Notice: Subject to any disclaimer, the term of this patent is extended or adjusted under 35 U.S.C. 154(b) by 207 days.

(21) Appl. No.: 12/625,554

(22) Filed: Nov. 24, 2009

(65) Prior Publication Data

US 2011/0079981 A1 Apr. 7, 2011

Related U.S. Application Data

(60) Provisional application No. 61/117,436, filed on Nov. 24, 2008.

(51) Int. Cl.
*B60R 3/00* (2006.01)

(52) U.S. Cl.
USPC .................................. 280/163; 280/169

(58) Field of Classification Search
USPC ................. 280/164.1, 169, 163, 848
See application file for complete search history.

(56) References Cited

U.S. PATENT DOCUMENTS

| | | | | |
|---|---|---|---|---|
| 2,077,822 A * | 4/1937 | Baker | | 280/163 |
| 4,203,611 A * | 5/1980 | Makela | | 280/163 |
| 4,257,620 A * | 3/1981 | Okland | | 280/848 |
| 5,257,847 A * | 11/1993 | Yonehara | | 280/163 |
| 5,286,049 A * | 2/1994 | Khan | | 280/163 |
| 5,788,321 A * | 8/1998 | McHorse et al. | | 280/163 |
| 5,895,064 A * | 4/1999 | Laubach | | 280/163 |
| 6,340,191 B1 * | 1/2002 | Brady | | 280/164.1 |
| 6,581,946 B2 | 6/2003 | Lund et al. | | |
| D513,398 S | 1/2006 | Kozak et al. | | |
| 6,997,469 B2 * | 2/2006 | Lanoue et al. | | 280/163 |
| 7,083,179 B2 | 8/2006 | Chapman et al. | | |
| D546,259 S | 7/2007 | Metros et al. | | |
| 7,287,770 B2 | 10/2007 | Drabant et al. | | |
| 7,334,807 B2 | 2/2008 | Mulder et al. | | |
| 7,513,518 B1 * | 4/2009 | Mayville et al. | | 280/163 |
| 7,896,374 B2 * | 3/2011 | Kuntze et al. | | 280/169 |
| 2005/0062252 A1 | 3/2005 | Vincent | | |
| 2005/0087950 A1 | 4/2005 | Draper et al. | | |
| 2005/0127635 A1 | 6/2005 | Fichter | | |

* cited by examiner

*Primary Examiner* — Hau Phan

(74) *Attorney, Agent, or Firm* — Ryan N. Carter

(57) ABSTRACT

A running board attachment. The running board attachment forms a barrier to restrict the passage of objects through the area between a vehicle body and a running board mounted distantly from the vehicle body.

9 Claims, 4 Drawing Sheets

RUNNING BOARD ATTACHMENT

CROSS-REFERENCE TO RELATED APPLICATIONS

This application claims the benefit of U.S. Provisional Application No. 61/117,436 filed Nov. 24, 2008.

STATEMENT REGARDING FEDERALLY SPONSORED RESEARCH OR DEVELOPMENT

Not Applicable

BACKGROUND OF THE INVENTION

1. Field of Invention

The invention relates to an attachment for a running board mounted so that the running board is positioned apart from the vehicle body.

2. Description of the Related Art

Running boards, which are also referred to as step boards, step tubes, step bars, and nerf bars, are common attachments to vehicles, especially trucks, for both aesthetic and functional purposes. While many styles exist, running boards can be categorized as either flush-mount or extended-mount. Flush-mount running boards directly engage the vehicle body. Examples of flush-mount running boards are described in U.S. Pat. No. 7,083,129 issued on U.S. Pat. No. 7,083,179 to Chapman, et al., and U.S. Design Pat. No. D513,398, issued on Jan. 3, 2006 to Kozak, et al. Extended-mount running boards are held away from the vehicle body by the mounting brackets, which creates a gap between the vehicle body and the running board. Extended-mount running boards allow the running board to be positioned below the vehicle body height, which may be advantageous for assisting with entry into vehicles having a high ground clearance. Examples of extended-mount running boards are described in U.S. Pat. No. 7,334,807, issued on Feb. 26, 2008 to Mulder, et al.; U.S. Pat. No. 7,287,770, issued on Oct. 30, 2007 to Drabant, et al., and U.S. Pat. No. 6,581,946, issued on Jun. 24, 2003 to Lund, et al.

BRIEF SUMMARY OF THE INVENTION

An apparatus for use with a running board adapted to be attached to the body of a vehicle, the running board having a step region positioned away from the body of a vehicle and defining an open area between the step region and the vehicle body, the apparatus comprising a shield member defining a top edge terminating near the vehicle body and a bottom edge terminating near the running board, said shield member extending between the running board and the vehicle body and forming a barrier to restrict objects from passing between the running board and the vehicle body.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A running board attachment is illustrated in the accompanying figures and described in the corresponding text. The running board attachment forms a barrier to restrict the passage of objects through the area between a vehicle body and a running board mounted distantly from the vehicle body ("an extended-mount running board").

Figure 1:
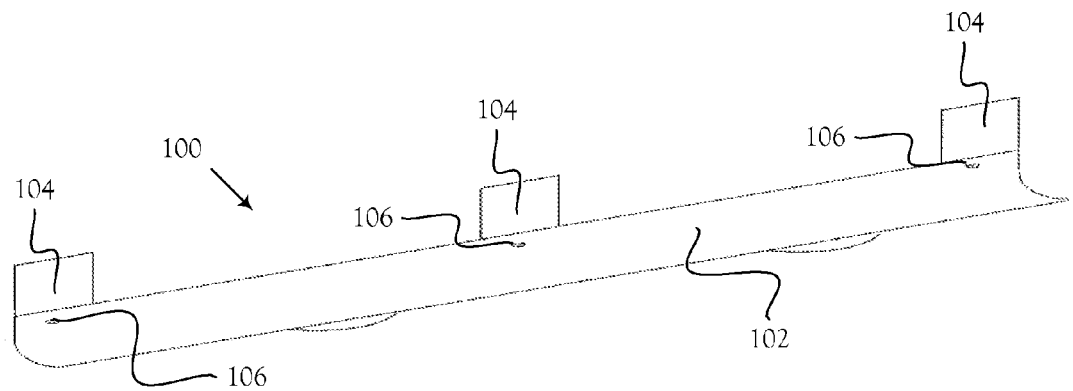
FIG. 1 is a hand-drawn illustration of one embodiment of a running board attachment, according to the present invention, installed on the running board brackets of a vehicle.
Figure 2:
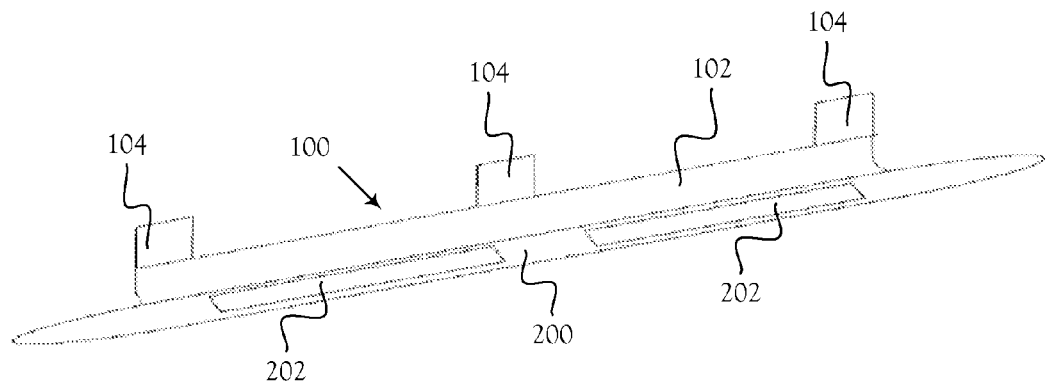
FIG. 2 is a hand drawn illustration of the running board attachment of FIG. 1 installed behind a running board.

FIG. 1 is an illustration of one embodiment of a running board attachment 100. The running board attachment 100 includes a shield member 102 that is attached to the running board brackets 104 of a vehicle by fasteners 106. FIG. 2 is an illustration of the running board attachment 100 installed behind a running board 200 having step regions 202.

Figure 3:
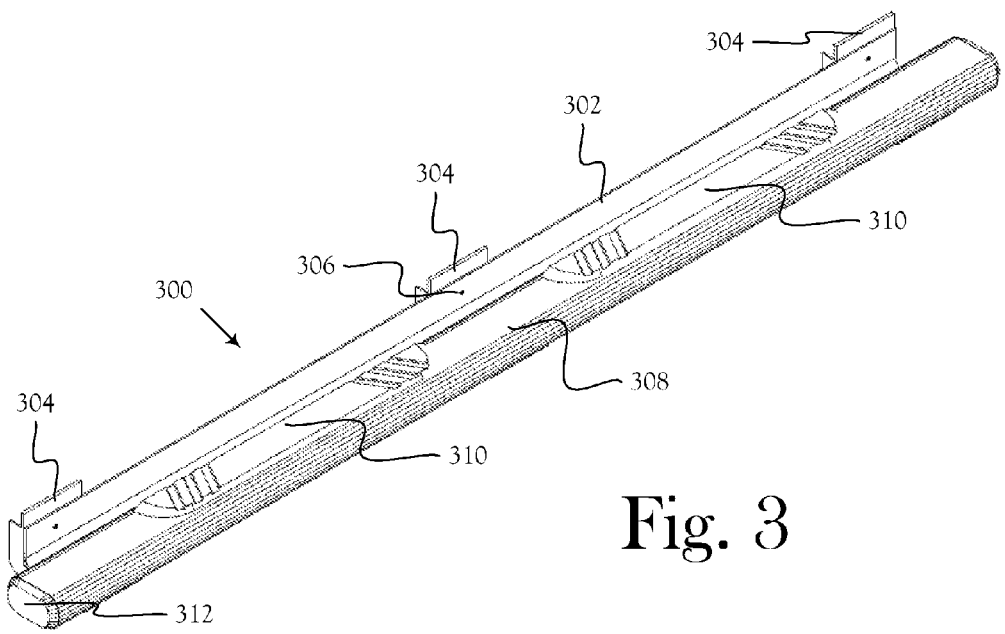
FIG. 3 is an isometric view of one embodiment of a running board attachment, according to the present invention, installed behind a running board on a vehicle.
Figure 4:
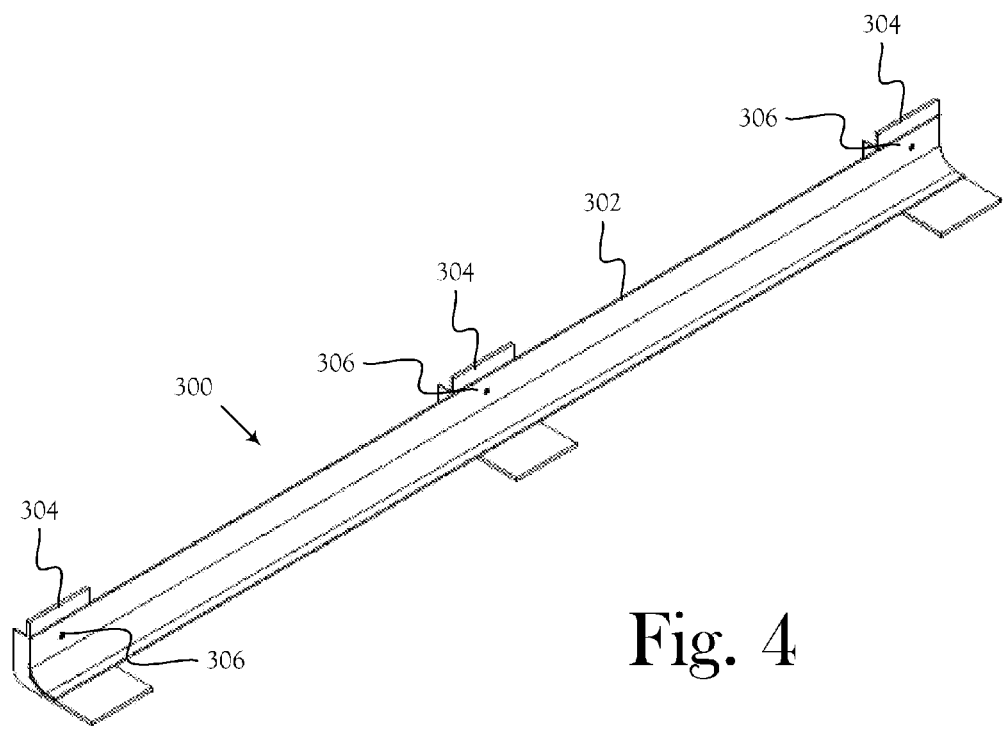
FIG. 4 is an isometric of one embodiment of a running board attachment of FIG. 3 installed on the running board brackets of a vehicle with the running board removed.

FIG. 3 is an isometric view of one embodiment of a running board attachment 300. The running board attachment 300 includes a shield member 302 that is attached to vertical extensions of the running board brackets 304 of a vehicle by fasteners 306. The shield member 302 extends between the running board and the vehicle body and defines a top edge terminating near the body of the vehicle and a bottom edge terminating near the running board. A running board 308 is attached to the horizontal extensions of the running board brackets 304. In the illustrated embodiment, the running board 308 is a tubular member with two step regions 310. A pair of end caps 312 close the ends of the running board 308. FIG. 4 is an isometric of one embodiment of a running board attachment of FIG. 3 installed on the running board brackets of a vehicle with the running board removed. In general, the shield member 302 is curved and generally conforms to the dimensions of the running board brackets 304 and may be of general applicability or customized to the running board brackets of a particular vendor.

Figure 5:
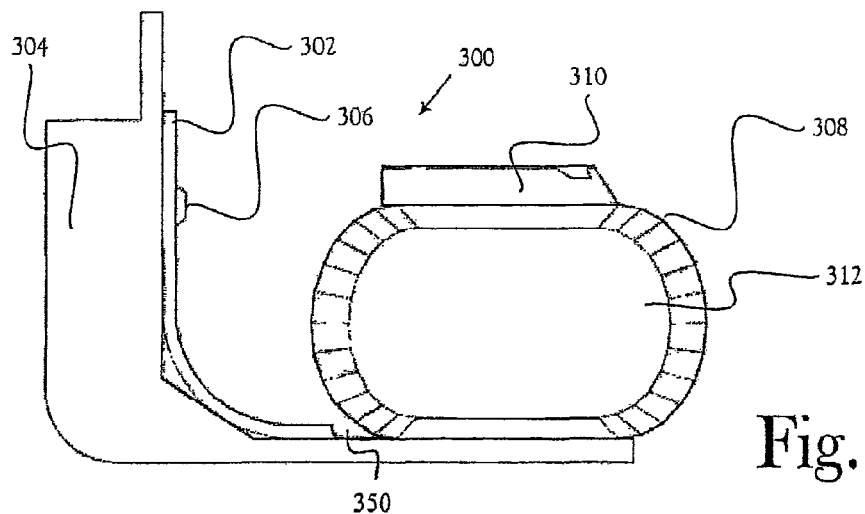
FIG. 5 is a side elevation view of the running board attachment of FIG. 3.
Figure 6:
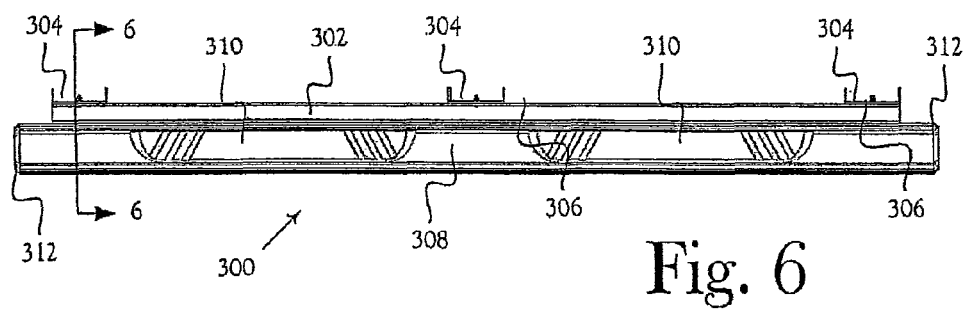
FIG. 6 is a top plan view of the running board attachment of FIG. 3.
Figure 7:
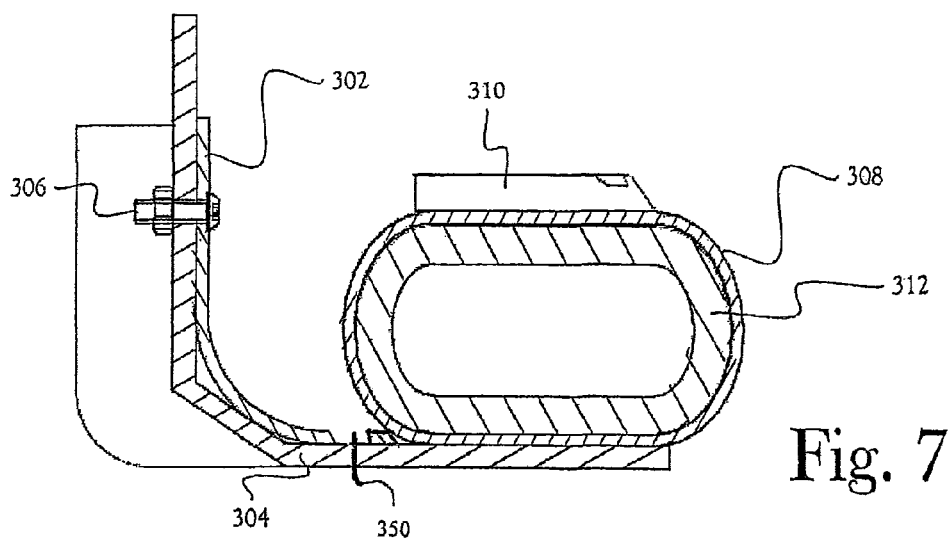
FIG. 7 is a sectional side elevation view of the running board attachment of FIG. 3, taken along section 6-6.

FIGS. 5-7 provide other views of the running board attachment 300 of FIG. 3. FIG. 5 is a side elevation view of the running board attachment of FIG. 3. FIG. 6 is a top plan view of the running board attachment of FIG. 3. FIG. 7 is a sectional side elevation view of the running board attachment of FIG. 3, taken along section 6-6.

Figure 8:
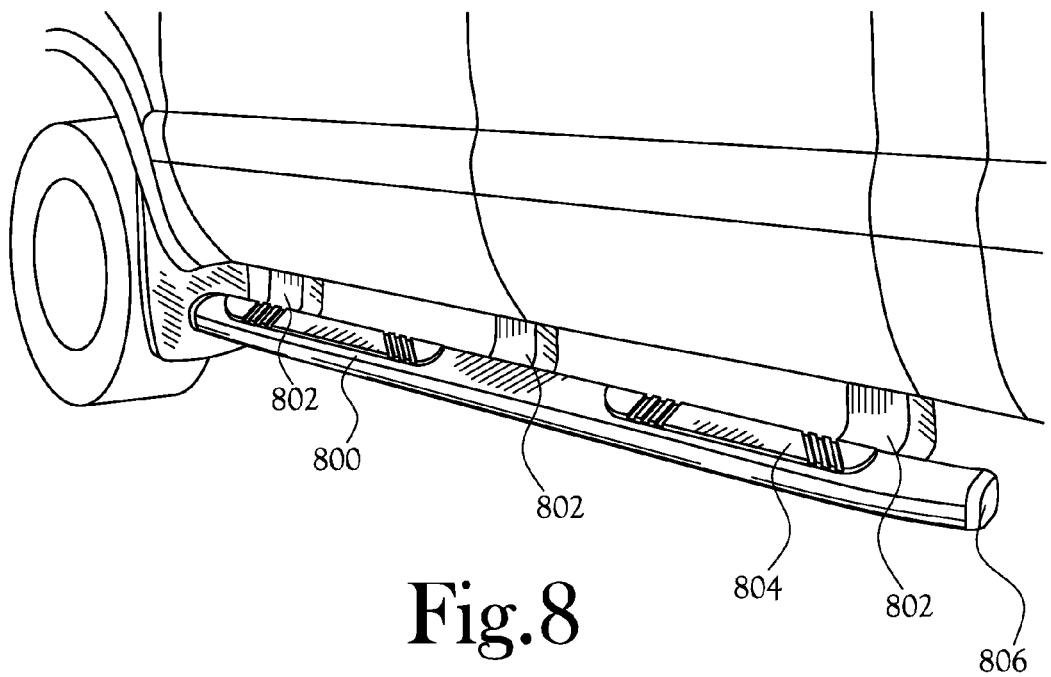
FIG. 8 is an illustration of a vehicle with a running board prior to installation of an embodiment of the running board attachment according to the present invention.
Figure 9:
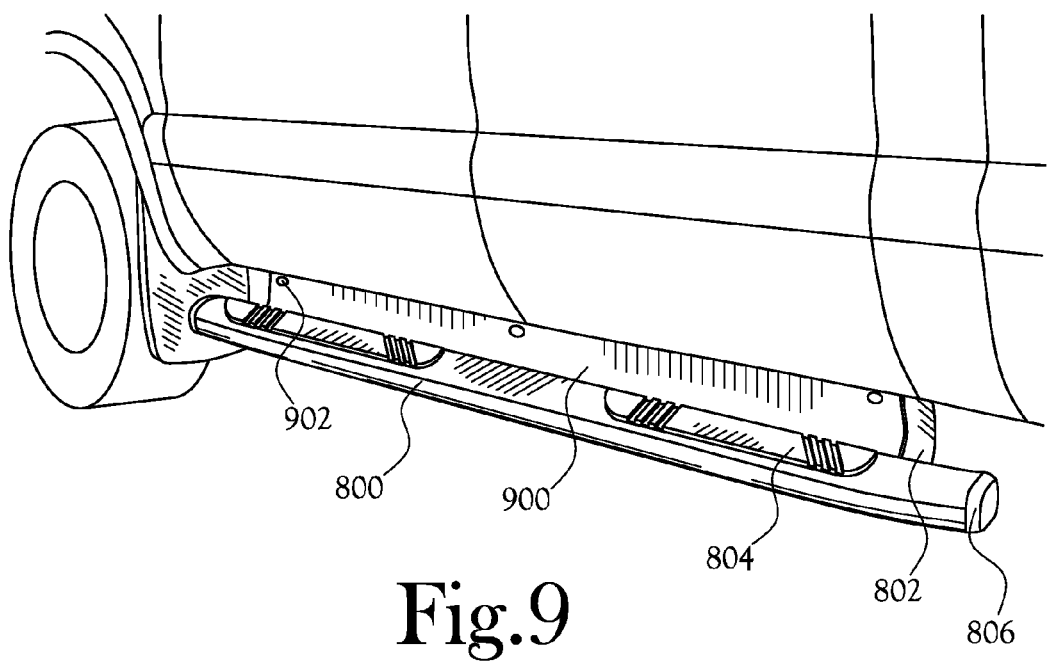
FIG. 9 is an illustration of the vehicle of FIG. 8 following the installation of one embodiment of the running board attachment according to the present invention.

FIG. 8 is an illustration of a vehicle with a running board 800 prior to installation of an embodiment of the running board attachment according to the present invention. In the photographed embodiment, three running board brackets 802 support the running board 800. The running board 800 includes step regions 804 and end caps 806. FIG. 9 is an illustration of the vehicle of FIG. 8 following the installation of one embodiment of the running board attachment 900 using fasteners 902.

The shield member 302 serves to cover a substantial portion of the open area between the mounting brackets that support a running board and forms a barrier that restricts objects from passing through the open area. By closing off the open area, the shield member 302 provides a stop that prevents the foot of a person stepping on the running board from sliding forward far enough to fall through the open area. In one embodiment, a portion of the shield member cooperates with the running board to only allow a portion of a human foot to travel beyond the inner edge of the step region of the running board toward the vehicle body thereby preventing the human foot from slipping between the step region and the vehicle body portion. In the illustrated embodiment, the stop is the substantially vertical surface of the shield member. Further, the shield member 302 defines a diverter that reduces the amount of mud and other fluids or substances that are splashed onto the running board (including the step regions) from underneath the vehicle and that potentially cause the running board and step regions to become slippery. The shield member 302 also helps prevent debris, such as limbs, from becoming caught in the open area and being drug by the vehicle. Similarly, the shield member 302 also helps prevent debris, such as gravel, from hitting the body of the vehicle, in particular the finished surfaces, thus helping to protect the finish of the vehicle from damage. Finally, by preventing debris from hitting or being drug by the vehicle, the shield member 302 makes the vehicle quieter.

In an alternate embodiment, the running board attachment is configured for use with a running board that is directly mounted to the body of the vehicle without separate brackets. This primarily occurs in the case of a running board formed from a shaped tubular member (commonly referred to as a "nerf" bar, a step tube, or step bar). The shaped tubular member has an elongated step region that is installed parallel to the side of the vehicle body with ends that are angled or curved towards the vehicle body to hold the step region out away from the vehicle body. Each end of the shaped tubular member is attached to a bracket on the vehicle body to support the shaped tubular member. In this alternate embodiment, the running board attachment defines a pair of planar attachment members configured to lie in a plane parallel to the end face of the shaped tubular member. In one embodiment, at least one opening is defined in each attachment member to receive a fastener. The attachment members extend from each end of the running board attachment and are positioned between the end face of the shaped tubular member and corresponding bracket so that when the shaped tubular member is secured to the bracket, the running board attachment is also secured. In other words the fastener that secures the shaped tubular member to the bracket passes through the opening in the attachment member that is inserted between the bracket and the end face of the shaped tubular member and secures the running board attachment in place. In an alternate embodiment, the attachment member is held in a place by a friction fit between the end face of the shaped tubular member and the bracket.

In another embodiment, the running board attachment includes a set of shield brackets that conform to the shape of the shield member. The shield brackets attach to the vehicle body and to the running board and are used in lieu of the brackets that are supplied with the running board to support the running board away from the body of the vehicle.

In yet another embodiment, the shield member attaches to the vehicle body and to the running board and are used in lieu of the brackets that are supplied with the running board to support the running board away from the body of the vehicle. In this embodiment, the shield member includes ridges, rolled edges, bars, and/or other similar reinforcement structures that allow the shield member to support the running board in the desired position away from the body of the vehicle and bear the load of impacts to the running board and use of the running board (e.g., stepping on the running board).

The shield member 302, and other components of the running board attachment 300, can be fabricated from various materials and in various colors and/or patterns to match, compliment, or otherwise individualize or customize the vehicle. Generally, the materials used for the shield member and other components of the running board attachment are weather and corrosion resistant and are readily shapeable through common manufacturing processes, such as rolling, milling, and molding. Such materials as plastics, polymers, aluminum, and stainless steel. Other metals may be used and are typically painted to reduce corrosion. In the illustrated embodiments, the shield member 302 is shown as a continuous sheet of material. As shown in FIGS. 5 and 7, the shield member 302 is modified to have a peforation 350 along the lower edge to allow drainage and prevent water or other fluids from collecting in the shield member 302. The perforation 350 may be accomplished through the introduction of weep holes, by using a fluid porous material, forming a channel, or by using a mesh or similar structure.

Although certain embodiments and features have been shown and described, they are not intended to be limiting. For example, although the fasteners are illustrated as nuts and bolts, other fasteners can be used without departing from the scope and spirit of the present invention. Further, the number of fasteners used and the type, style, or number of running board brackets may vary. The running board attachment need not attach to each running board bracket. In one embodiment, the running board attachment is attached only to one or more central running board brackets. In another embodiment, the running board attachment is attached only to the outer running board brackets. In a still further embodiment, the running board attachment is attached to the underside of the running board. Another embodiment allows the running board attachment to be attached between the points of attachment of the running board to the vehicle. In yet another embodiment, the running board attachment includes brackets for securing the running board attachment and the running board to the vehicle that replace the original running board brackets. Other embodiments allow the shield member to extend beyond the outer running board brackets or encompass less than all of the distance between the two running board brackets. In one embodiment, the running board attachment extends the entire length of the running board. In another embodiment, the running board attachment extends only between two neighboring running board brackets, effectively shielding only half of the running board. While the illustrated embodiments show the use of nuts and bolts for the fasteners, other suitable fasteners, for example, snap-on fasteners, or attachments without fasteners, for example, a tension fit created between the running board, the brackets, and the vehicle body may be used without departing from the scope and spirit of the present invention.

While the present invention has been illustrated by description of several embodiments and while the illustrative embodiments have been described in detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the scope or spirit of the general inventive concept.

What is claimed is:

1. An apparatus for use with a running board secured to and carried by a set of mounts that attach to the body of a vehicle and position the running board away from the body of a vehicle, the running board and the vehicle body defining an open area between the vehicle body and a step region of the running board, said apparatus comprising: a shield member secured to selected mounts from the set of mounts and substantially cover the open area between the running board and the vehicle body, said shield member defining a top edge terminating near the vehicle body and a lower edge terminating near the running board, but not attached to the running board when the shield member is secured to the selected mounts such that a perforation exists between the shield member and the running board to allow drainage of fluids.

2. The apparatus of claim 1 wherein said shield member has a profile substantially conforming to the profile of the mounts.

3. The apparatus of claim 1 wherein said shield member includes a stop that prevents a user's foot from slipping into the open area between the running board and the vehicle body.

4. The apparatus of claim 1 wherein said shield member includes a first portion configured to extend above the step region when said shield member is secured to the selected mounts, said first portion configured to cooperate with the running board to only allow a portion of a human foot to travel beyond the inner edge of the step region toward the vehicle body thereby preventing the human foot from slipping between the running board and the vehicle body.

5. The apparatus of claim 1 wherein said shield member is configured to prevent debris from entering the open area from below the vehicle and becoming caught between the running board and the vehicle body.

6. The apparatus of claim 1 wherein said shield member defines a diverter configured to divert a substance that approaches the open area from below the vehicle to reduce the amount of the substance that collects on the step region of the running board.

7. The apparatus of claim 1 wherein said shield member is configured to prevent debris projected from below the vehicle from striking or striking the finished surfaces of the vehicle body near said shield.

8. The apparatus of claim 1 wherein said shield member is configured to be secured to each mount in the set of mounts.

9. An apparatus for use with a running board secured to and carried by a set of mounts that attach to the body of a vehicle and position the running board away from the body of a vehicle, the running board and the vehicle body defining an open area between the vehicle body and a step region of the running board, said apparatus comprising: a shield member secured to selected mounts from the set of mounts and substantially cover the open area between the running board and the vehicle body, said shield member defining a top edge terminating near the vehicle body and a lower edge terminating near the running board, but not attached to the running board when the shield member is secured to the selected mounts such that a perforation exists between the shield member and the running board to allow drainage of fluids.

* * * * *